Sept. 3, 1929.  J. B. ICRE  1,726,566
MACHINE FOR FEEDING, MOLDING, AND CUTTING DOUGH
Filed Nov. 11, 1927  4 Sheets-Sheet 1
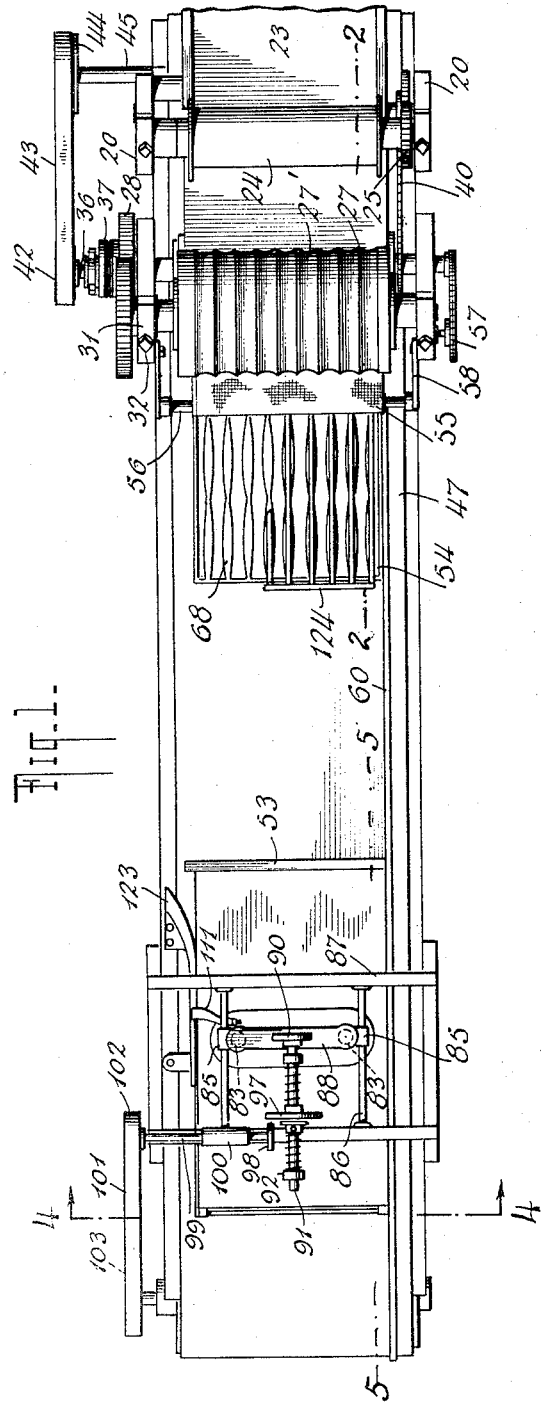
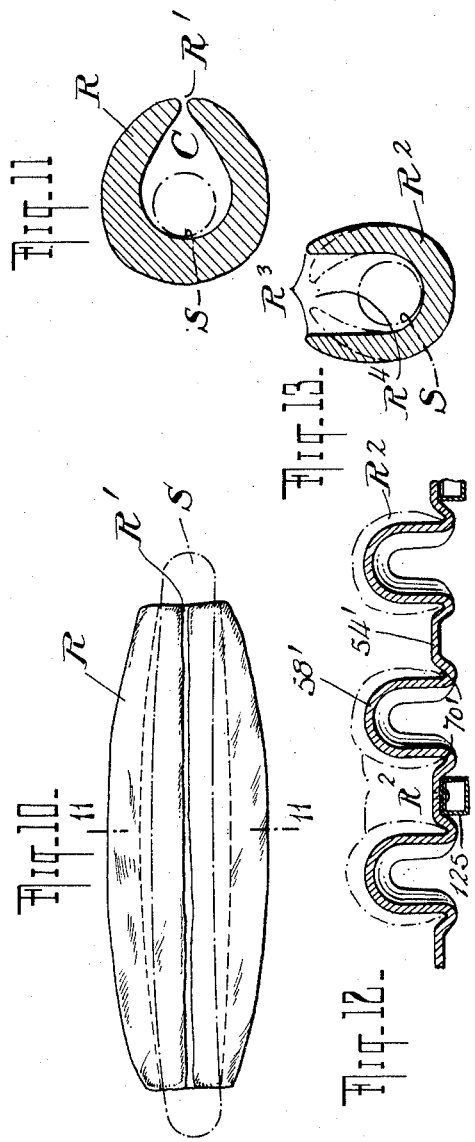
INVENTOR
JEAN BAPTISTE ICRE
BY
ATTORNEYS

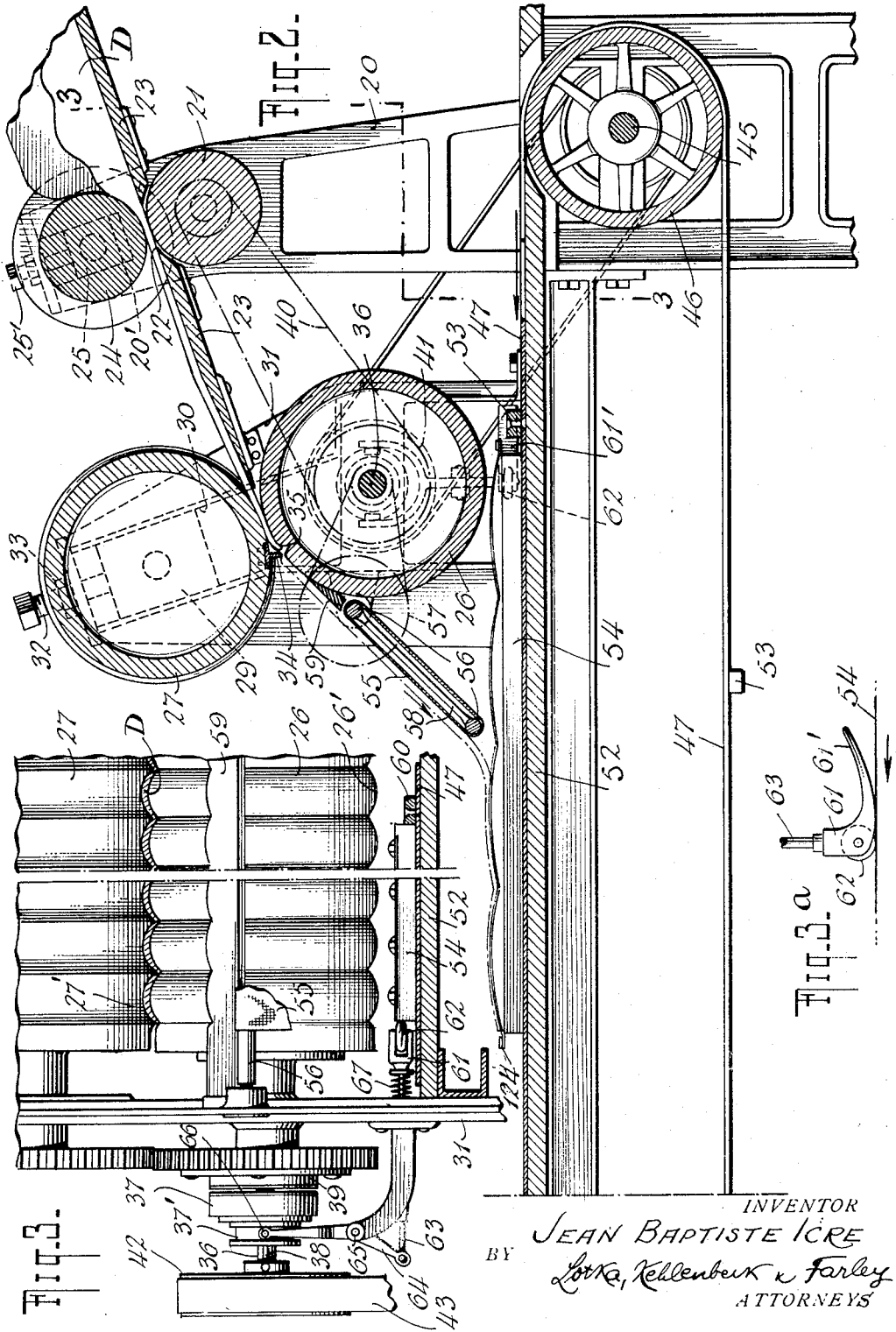

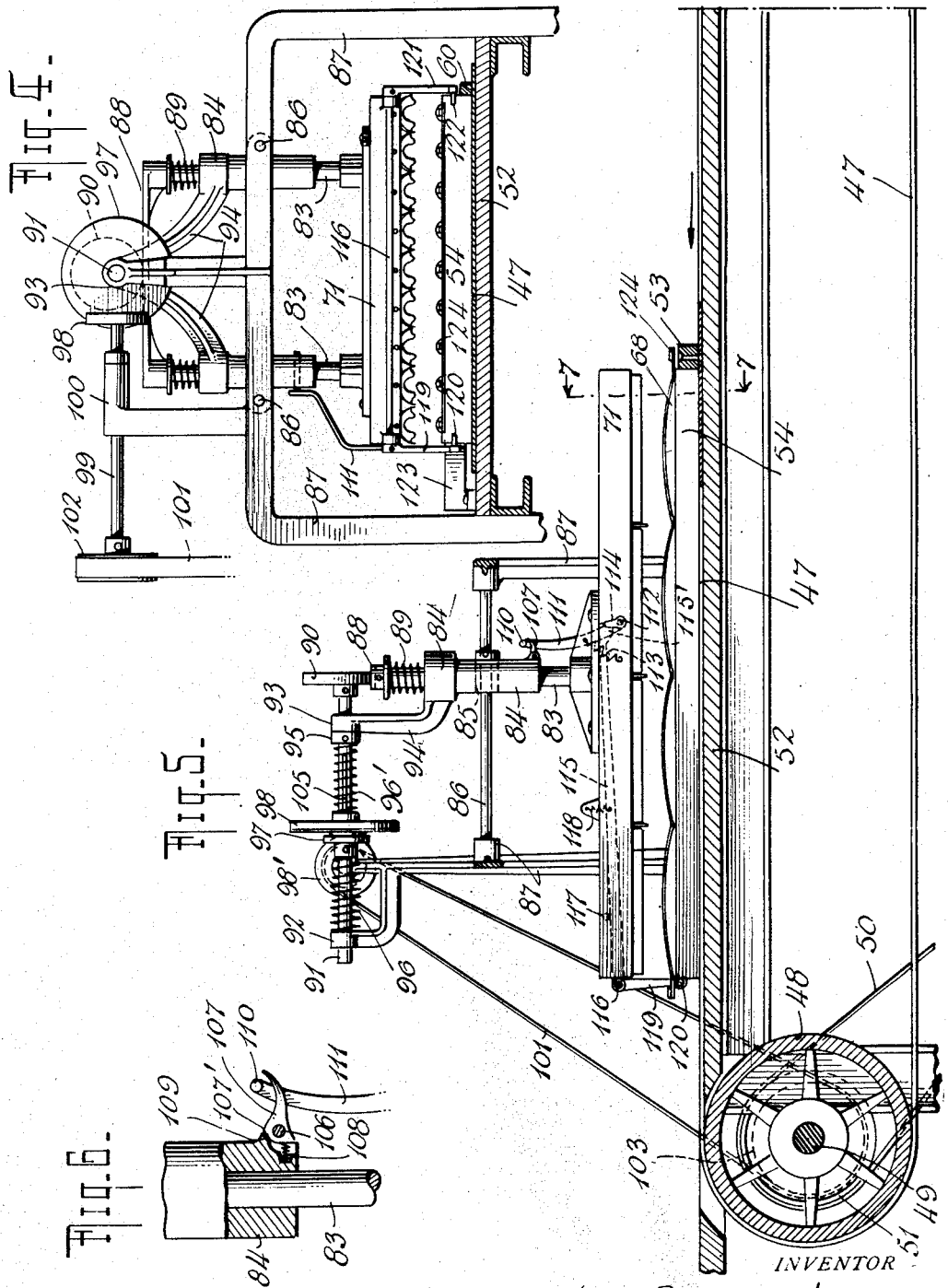

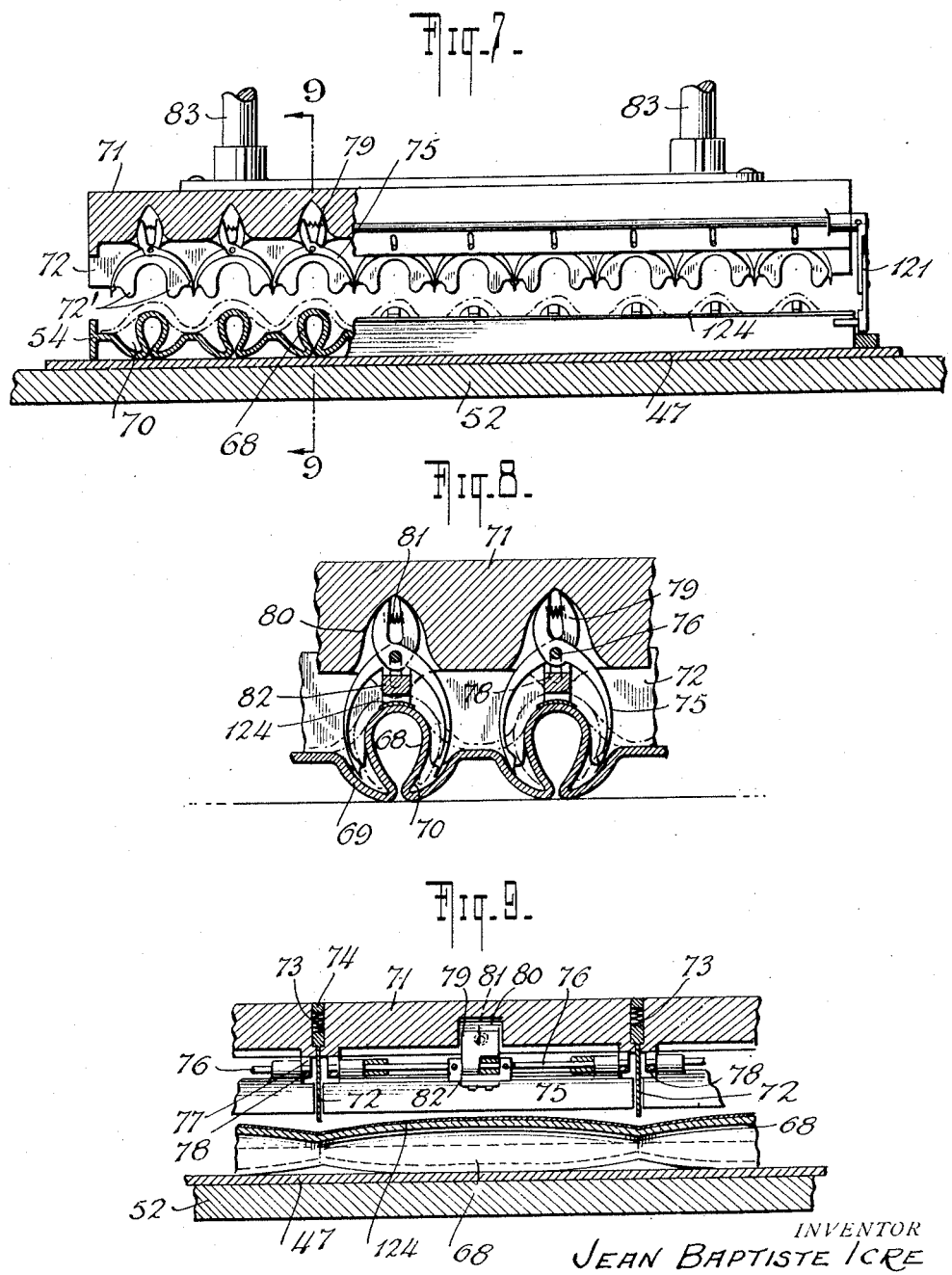

Patented Sept. 3, 1929.

1,726,566

UNITED STATES PATENT OFFICE.

JEAN BAPTISTE ICRE, OF NEW YORK, N. Y.

MACHINE FOR FEEDING, MOLDING, AND CUTTING DOUGH.

Application filed November 11, 1927. Serial No. 232,541.

My present invention relates to a machine which I have devised for the specific purpose of feeding dough in the form of a sheet, partially molding such sheet into portions adapted to be subsequently baked to form hollow rolls, transferring said partially molded portions into pans and further molding them to conform to the shape of the finished article, and severing portions of the sheet at intervals. I desire it to be understood, however, that I do not desire to restrict myself to the specific purpose indicated above, or to the particular embodiments illustrated in the accompanying drawings, as the invention is susceptible of a more general application and includes features available in conjunction with the treatment of plastic materials other than dough.

Typical and satisfactory examples of my invention are shown in the accompanying drawings, in which Fig. 1 is a plan view of the improved machine; Fig. 2 is a partial longitudinal vertical section on line 2—2 of Fig. 1; Fig. 3 is a transverse vertical section on line 3—3 of Fig. 2; Fig. 3ª is a plan view of a detail; Fig. 4 is an end view of the supplemental molding and cutting mechanism, with parts in section on line 4—4 of Fig. 1; Fig. 5 is a side elevation of the same mechanism, with parts in section on line 5—5 of Fig. 1; Fig. 6 is an enlarged detail side elevation partly in section, of a portion of the mechanism shown in Fig. 5; Fig. 7 is an enlarged partial transverse section of said mechanism and elements co-operating therewith, on line 7—7 of Fig. 5; Fig. 8 is a still more enlarged view, taken on the same plane as Fig. 7, but showing the parts in a different position; Fig. 9 is a partial longitudinal vertical section, on line 9—9 of Fig. 7; Fig. 10 is an outside view of a roll such as may be made with the aid of my improved machine; Fig. 11 is a cross section on line 11—11 of Fig. 10; Fig. 12 is a transverse section showing another form of mold; and Fig. 13 is a central transverse section of a roll made with the aid of the mold shown in Fig. 12.

The machine illustrated in Figs. 1 to 9 comprises a suitable frame having standards of supports 20 in which is journaled a feed roller 21 projecting into an opening or transverse slit 22 in a stationary feed chute 23, to the upper end of which a mass of dough D is supplied by hand or in any other suitable manner. Above the feed roller 21 is arranged another roller 24, journaled in blocks or slides 25 movable toward and from the roller 21. Screws 25' or equivalent devices are provided for adjusting the slides 25 and with them the roller 24 toward or from the roller 21, and thus varying the thickness of the sheet of dough which passes through the throat between the rollers 21, 24. These rollers are geared together, as shown at 25, the teeth being of sufficient depth to remain in mesh throughout the relatively moderate range of adjustment of the upper roller 24.

The lower end of the chute 23 delivers the sheet of dough, of predetermined thickness, to the preliminary molding and cutting mechanism. This mechanism comprises a lower roller 26 and an upper roller 27 of like diameter both provided with registering circumferential ribs and grooves such as shown at 26' and 27' respectively. The rollers are geared together, as at 28, in a manner similar to that described with reference to the rollers 21, 24, and the upper roller 27 is adjustable toward and from the lower roller 26, as by mounting the shaft of the upper roller in blocks 29 slidable along guide ways 30 in frame portions or brackets 31; suitable means, such as a screw 32 and nut 33, are provided for shifting the slide blocks 29 and securing them after adjustment. The upper roller 27 carries a longitudinal cutter 34 projecting from the periphery of said roller and arranged to project into a corresponding longitudinal groove or recess 35 on the lower roller 26. The latter is mounted loosely on its shaft 36, but is coupled with said shaft at times by clutch mechanism referred to hereinafter, said mechanism including a clutch member 37 slidably lengthwise of the shaft, but held to rotate therewith, as by a longitudinal key 38, and a companion clutch member 39 connected rigidly with the lower roller 26, it being understood that said roller and its clutch member 39 are held against movement lengthwise of the shaft 36.

A chain, belt, or other suitable drive 40 connects the lower roller 21 with a pulley 41 held to rotate with the lower roller 26, while the other end of said shaft 36 carries a pulley 42 connected by a belt 43 with a pulley 44 on a shaft 45. On this shaft is mounted rigidly a pulley 46 supporting a conveyer belt 47, which at the other end of its upper run is supported by a similar pulley 48 on a shaft 49. The conveyer is operated continuously in the direction indicated by arrows, for instance by connecting an electric motor (not shown) by a belt 50 with a pulley 51 on the shaft 49.

The upper run of the conveyer 47 is also supported by a stationary table 52. On the outer surface of said conveyer I secure one or more transverse ribs 53 preferably made of leather or other material flexible enough to follow the conveyer in its path around the pulleys 46, 48 yet also stiff enough to take along the pans or molds 54 adapted to be placed on the upper run of the conveyer and to be fed thereby (toward the left in Figs. 2 and 5). These pans or molds, the details of which will be described below, are adapted to receive the dough which has received a preliminary molding during its passage between the rollers 26, 27.

In order to secure a proper transfer of the dough from the rollers 26, 27 to the pans or molds 54, I provide an inclined permanently driven delivery or transfer belt 55 supported on rollers 56, one of which is shown operatively connected, by a belt 57, with the shaft 36. The rollers 56 are journaled in a stationary support 58, and a stationary inclined transfer bridge 59 is preferably arranged to span the gap between the lower roller 26 and the upper end of the transfer belt 55, said bridge having its upper surface flush with the upper run of said belt.

While the conveyers 47, 55 operate continuously, the rollers 21, 24, 26, 27 are rotated intermittently, the rollers 26, 27 performing one revolution at a time, this operation being controlled by the molds or pans 54 as they are fed by the conveyer 47. At one side, this conveyer has a longitudinal rib or ledge 60 constituting a stop for positioning one of the side edges of a mold or pan 54. At its other side, said pan is adapted to engage, first the inclined surface 61' of a shoe 61 and subsequently the periphery of a roller 62 journaled in said shoe about a vertical axis. The shoe is carried by a rod 63 mounted to slide in the frame of the machine, transversely of the path of the pan or mold 54. The outer end of the rod 63 is connected operatively with a lever 64 mounted to swing on a stationary fulcrum 65 and having a connection 66 of well-known character to engage the circumferential groove of a collar 37' rigid with the clutch member 37. A spring 67 normally throws the clutch members 37, 39 out of engagement and projects the inclined surface or heel 61' of the shoe 61 into the path of the pans or molds 54.

At a point farther on in its travel, the pan or mold is adapted to come into operative relation to the supplemental molding and cutting mechanism illustrated particularly in Figs. 1 and 4 to 9 inclusive. The pan or mold is formed with parallel longitudinal rows of hollow core portions 68 corresponding to the ribs 26' and grooves 27' in number and relative arrangement. Each row is shown as composed of four hollow core portions 68 in tandem. Adjacent to each core portion, at the longitudinal sides thereof, extend outer molding members 69 forming with the respective core portions, tapering downwardly converging pockets 70 for the molding of tubular rolls substantially crescent-shaped in cross-section, as set forth more fully hereinafter. Fig. 9 shows that the hollow core portions 68 are slightly convex longitudinally, their cross section being smaller at the ends than at the central portions.

The supplemental cutting and molding mechanism comprises a vertically movable plunger or presser 71, provided with as many cutting and mold-sections as there are mold portions 68, in proper relation to co-operate with said mold portions. The particular embodiment has nine rows of mold-portions 68, with four mold portions in each row as described, and the plunger 71 has thirty-six correspondingly located sections or sets of instrumentalities. These comprise transverse cutters 72 arranged in proper planes to operate at the ends of the core portions 68. Each cutter is provided with a plurality of fork-like portions 72' adapted to straddle the cores at the ends of the core portions 68 and to enter the pockets 70 when the plunger 71 is depressed. Preferably the cutters 72 are not rigid with the plunger, but connected thereto yieldingly, the cutters being fitted to slide vertically in the plunger, and normally projected downwardly by means of springs 73, the upper ends of which bear against abutments 74 stationary in relation to the plunger 71.

In the spaces between the cutters 72, the plunger 71 carries supplemental molding elements which are also adapted to serve as longitudinal cutters, to sever the sheet of dough into (nine) rows or strings of individual dough portions, each row consisting of four such portions, in the particular example illustrated. These elements comprise pairs of jaws 75 pivoted to each other at 76 and crossed after the fashion of scissor blades: The pivots 76 extend lengthwise of the conveyer 47 and are movable vertically in slots 77 provided in projections 78 of the plunger 71. The jaws proper, or lower portions 75, are adapted to co-operate with the mold and to enter the pockets 70, as will be described hereinafter. The upward portions or extensions 79 are movable in upwardly-tapering recesses 80 of the plunger 71, and springs 81, interposed between the members or extensions 79 of the same pair, tend to force said members apart, against the walls of the respective recesses 80. By this action, and under the influence of gravity as well, the jaws 75, 79 will normally assume their lower positions, with reference to the plunger body 71, see Fig. 7.

I may provide in connection with each pair of jaws 75, 79 a die 82 adapted to extend through the layer of dough and to stamp therein the name of the baker or dealer, or a trade mark, etc. Such die, as shown, may be secured rigidly to the respective pivot 76, and turning of the pivot pin on its axis may be prevented by giving a square or other angular cross section to those portions of the pivot pins 76 which move in the slots 77.

The plunger or presser body 71 is secured to upright rods 83 slidable up and down in sleeves 84 which are rigid or integral with horizontal sleeves 85 slidable on stationary parallel rods 86 extending lengthwise of the conveyer 47, the carriers of said rods being indicated at 87. The two rods 83 are connected by a horizontal cross bar 88, and springs 89 are interposed between said bar and the sleeves 84, with a tendency to lift said bar and the plunger 71. The bar 88 is thus held in contact with an actuating cam 90 secured to a shaft 91 ranging lengthwise of the path of the conveyer 47 and journaled in a stationary bearing 92 and also in a bearing 93 which is connected with the sleeves 84 by brackets 94 or otherwise compelled to move lengthwise of the rods 86 in unison with said sleeves. The shaft 91 is movable lengthwise in its bearing 92, such longitudinal movement of the shaft taking place in unison with the movement of the bearing 93, for instance, a collar 95, secured rigidly on the shaft, may be held in contact with the bearing 93 by a coiled spring 96 engaging the stationary bearing 92 and a collar 97 rigid on the shaft 91. Said collar is adapted to engage a friction disk 98, the face of which is adapted to engage the periphery of a driving friction pulley 98' mounted rigidly on a transverse shaft 99 journaled in a stationary bearing 100. A spring 96' tends to hold the friction disk 98 against the collar 97. Continuous rotation is imparted to the shaft 99, for instance by means of a belt 101 which transmits power to a pulley 102 on the shaft 99 from a pulley 103 on the shaft 49 of the conveyer pulley 48. Normally, the friction disk 98 is held out of contact with the friction pulley 98', by means of the coiled spring 96 interposed between the stationary bearing 92 and the collar 97. The friction disk 98 is movable lengthwise of the shaft 91, but held to rotate therewith, for instance by means of a feather-and-groove connection 105 (see Fig. 5).

On one of the sleeves 84 is pivoted about a transverse horizontal axis 106, an arm 107 provided with a lug 107' which a spring 108 tends to hold against a stop 109, as shown in Fig. 6. This arm is adapted to be engaged by a pin 110 on a lever 111 which is fulcrumed on the plunger body 71 about a transverse axis 112, a spring 113 tending to pull the lever 111 toward the axis 106, or in other words, forwardly. The lever 111 is connected rigidly with an arm 114 adapted to engage at one side of a lug 115' on a lever 115 pivoted to the plunger 71 about a transverse axis 116 and normally held against a stop 117 by a spring 118. The lever 115 has an extension 119 provided with a pin or other projection 120 extending into the path of the mold 54 and adapted to be engaged by the forward edge of the mold. Fig. 4 shows the lever 115 connected by its rock shaft 116 with an arm 121 carrying an inwardly projecting pin 122 in line with the pin 120 and adapted to engage the forward edge of the mold at the other side.

A stationary guide 123 is shown in Fig. 1 in a position to engage the mold 54 on the side opposite to the ledge 60, at the point where the supplemental molding and cutting mechanism is operative.

In detail, the operation is as follows: A batch of dough D is placed on the upper end of the feed chute, adjacent to the feed rollers 21, 24, after the upper roller 24 has been adjusted to the proper distance from the lower roller 21. The drive of these rollers is started in any suitable manner, for instance by placing a pan or mold 54 on the conveyer 47, in advance of a transverse rib 53, so that this rib will carry the mold 54 forward. This motion will bring the mold against the heel 61' of the shoe 61 and then against the roller 62. Through the rod 63 and its connections, the motion which the mold 54 imparts to the shoe 61 is transmitted to the clutch member 37, to bring the latter into engagement with the clutch member 39, and thereby start rotation of the roller 26. As the latter is operatively connected with the lower feed roller 21 by the belt 40, rotation of the feed rollers 21, 24 is started at the same time. The batch of dough D is thus fed between the rollers 21, 24 and spread into a sheet of uniform thickness, corresponding to the distance between said rollers. This sheet then passes between the rollers 26, 27, and is thus partly molded from the flat form into one having (nine) parallel longitudinal ribs or corrugations, as shown in Fig. 3. As soon as the knife or cutter 34 comes into registry with groove 35, there is severed from the sheet of dough, a piece or section, the length of which corresponds to the circumference of the roller 26 or 27. The mechanism is so dimensioned that the length of the mold 54 will cause the clutch members 37, 39 to remain in engagement just long enough to give the rollers 26, 27 one complete revolution. At the end of this revolution, the mold 54 will have cleared the shoe 61, and the spring 67 will restore the parts to their original position, bringing the clutch member 37 away from the clutch member 39 and stopping the rotation of the rollers 21, 24, 26, and 27.

The longitudinally corrugated piece of dough, cut off as described, drops on to the transfer belt 55 which travels continuously and feeds the dough into a mold 54 as the latter is fed forward under the transfer belt by the continuously traveling conveyer 47. The dough is thus deposited in or upon the mold, each of the corrugations of the dough corresponding to a longitudinal row of core portions 68.

As the mold with the dough deposited thereon continues to travel forward with the conveyer 47, such mold comes into operative relation to the supplementary pressing and cutting mechanism. The forward edge of the mold engages the pins 120 and 122 and from then on carries the plunger 71 and associated parts along forward, lengthwise of the rods 86. The plunger 71 is at that time in its raised position, Fig. 4. As the brackets 94 move in unison with the plunger 71, lengthwise of the conveyer 47, the bracket 93 will cause the shaft 91 to move lengthwise in the same direction, compressing the spring 96 and bringing the friction disk 98 in contact with the friction pulley 98', the latter rotating continuously. During the further forward movement of the mold 54 and the shaft 91, the latter will slide lengthwise within the disk 98, since this disk can no longer move lengthwise in unison with the shaft. The collar 97 will thus become separated from the disk 98, and the spring 96' will in turn be compressed while the shaft 91 slides lengthwise relatively to the disk.

As soon as the disk 98 comes into frictional engagement with the pulley 98', said disk begins to rotate and the shaft 91, rotating with the disk, turns the cam 90 from the position Fig. 4, in which the plunger 71 is in its upper position, so as to depress the bar 88 and said plunger, while the latter continues to travel forwardly in unison and in registry with the mold 54. As the plunger descends, the lower ends of the jaws 75 will force the dough into the pockets 70, and as soon as the lower ends of the jaws come in contact with the outer molding members 69, the plunger 71 will continue to move downwardly without any substantial further downward movement of the jaws, the pivots 76 sliding in the slots 77, toward the upper ends of said slots. The action of the upwardly converging walls of the recesses 80 on the upper ends of the jaw extensions 79 will cause the jaws 75 to approach each other and fold the dough, as it were, around the core portions 68. At the same time, the dies 82 will impress a name or trade mark etc. into the dough. As the plunger 71 reaches its lower position, the cutters 72 will sever the dough between adjacent core portions 68 of the same row, while the jaws 75 will sever the dough between adjacent rows of core portions 68. Each of the latter will thus be covered and partly surrounded by an individual dough portion of substantially the shape of the finished roll R such as shown in Figs. 10 and 11, said roll being hollow, open at both ends, and provided with a longitudinal slit R'.

During the downward movement of the plunger 71, the pin 110 swings the arm 107 aside, the latter then swinging back under the influence of its spring 108, so that the pin 110 will then be below the arm 107. As the plunger 71 again moves upward during the continued rotation of the shaft 91, said pin 110 will come in contact with the arm 107 from below, and as the arm can not yield upwardly, the pin 110 will be arrested in its upward movement, with the result that the lever 111 will swing on its axis 112 in such a direction as to release the lever 115 from the locking action of the lever 111. As soon as this occurs, the continued forward movement of the mold will cause the lever 115 to swing in such a way as to carry the pins 120, 122 out of the path of the mold 54, said pins then riding on top of the mold and finally sliding off the rear end of the mold, the spring 118 then bringing the lever 115 back to its original position. During the upward movement of the plunger 71, the pin 110 will slide outwardly along the inclined lower face of the arm 107 and will finally clear the free end of said arm, whereupon the spring 113 will restore the lever 111 and its arm 114 to their original position. Finally the spring 96 will slide the plunger and its carrier back along the rods 86, to the original position.

The mold or pan 54 with the cut and molded pieces of dough is placed in an oven of any approved construction to bake the tubular longitudinally slotted rolls. These are intended primarily for use in connection with sausages placed within the rolls.

In order to facilitate the removal of the rolls from the mold 54, after baking, I may apply loosely on the upper surface of the mold, a removable frame having longitudinal stripper members 124 adapted to lie on top of the core portions 68. These stripper members will therefore be within the longitudinal cavity of the tubular baked rolls, and by moving such members transversely away from the core portions 68, the rolls will be slid off the said core portions, in substantially the manner disclosed more fully in my application Serial No. 225,423 filed in the United States Patent Office on October 11, 1927.

In Figs. 10 and 11, the tubular roll R has a narrow slit R', and at one side of the space which receives the sausage S, a tapering chamber C in which may be placed mustard or other additional food. In Figs. 12 and 13, I have illustrated a roll $R^2$ the slit $R^3$ of which is originally quite wide, being equal to the diameter of the interior of the roll. The mold employed for producing a roll of this type is shown in Fig. 12, and has flat bottom portions 54' with intervening longitudinal core portions 58'. In a cross section taken at the center (exactly midway between the ends of each core portion), the side walls of these core portions will be parallel, it being understood that Fig. 12 is such a section. Longitudinally, the core portions 58' will taper toward the ends, in order that the roll may have substantially the same internal taper as shown in Fig. 10. After baking, the roll may contract somewhat at the slit, so that from the width $R^3$ which the slit has immediately after molding, it will be reduced to the width indicated in Fig. 13 at $R^4$. However, even if the slit $R^3$ remained of the full width equal to the inner diameter of the roll, I should consider this as coming within my invention.

Fig. 12 also shows, on each side of the core portions 58', lateral pockets 70' having the same purpose and function as the pockets 70 of Figs. 7 and 8. Furthermore, Fig. 12 shows supports 125 secured to the bottom of the mold 54', to raise such mold off the floor of the oven and enable the heat to circulate around the mold.

I claim:

1. A machine of the class described, comprising a feed chute, spaced feed rollers between which the material coming from said chute is adapted to pass, a set of molding and cutting rollers adapted to receive the material from the feed rollers, the rollers of said set being provided with circumferential ribs and grooves to produce longitudinal corrugations in the material, and with a device for cutting the material transversely to its path, a transfer conveyer for delivering the cut portions of the material to molds, a main conveyer for feeding molds into and out of operative relation to the transfer conveyer, and a supplemental molding and cutting mechanism arranged to co-operate with the mold after the latter has been carried beyond said transfer conveyer.

2. In a machine of the class described, a set of feed rollers, a set of preliminary molding rollers arranged to receive the material coming from the feed rollers, a main conveyer for feeding molds, a transfer conveyer for delivering the material from the molding rollers to molds on the main conveyer, an operative connection to cause the two conveyers to move in unison, an operative connection for causing simultaneous operation of the feed rollers and molding rollers, and mechanism, controlled by the molds on the main conveyer, for starting and stopping the drive of said rollers.

3. In a machine of the class described, intermittently rotating rollers for feeding the material and severing measured portions therefrom, a continuously traveling main conveyer for feeding molds, a continuously traveling transfer conveyer for delivering said measured portions of material from said rollers to molds on the main conveyer, and mechanism, controlled by the molds on the main conveyer, for starting and stopping the drive of said rollers.

4. In a machine of the class described, a conveyer for feedings molds, a carrier having a portion extending into the path of a mold fed by said conveyer, and adapted to be taken along temporarily by such mold, a molding plunger movable on said carrier toward and from the conveyer, and mechanism for moving the plunger relatively to the carrier during the movement of the latter.

5. A device according to claim 4, including means tending to return the carrier to its initial position, and mechanism, controlled by the movement of the plunger away from the conveyer, for releasing the carrier from connection with the mold.

6. In a machine of the class described, a conveyer for feeding molds, a carrier movable lengthwise of the conveyer path and adjacent thereto, a molding plunger adapted to co-operate with a mold on the conveyer and movable on said carrier toward and from the conveyer, a device mounted on said carrier movable so as to project into the path of a mold on the conveyer or to be withdrawn from said path, and a locking device, mounted on the carrier, and controlled by the movement of the plunger relatively to the carrier, to normally lock the first-mentioned device in its projecting position and to release it for the return movement of the carrier when the plunger has performed its operation.

7. In a machine of the class described, a conveyer for feeding molds, a carrier movable lengthwise of the conveyer path and adjacent thereto, a molding plunger adapted to co-operate with a mold on the conveyer and movable on said carrier toward and from the conveyer, a driven shaft on the carrier, controlling the movement of the plunger relatively thereto, a rotary driving element into and out of driving connection with which the said shaft is brought by the movement of said carrier, and means for effecting movement of the carrier first in unison with the conveyer, and then in the opposite direction.

8. In a machine of the class described, a conveyer for feeding molds, a carrier movable lengthwise of the conveyer path and adjacent thereto, a molding plunger adapted to co-operate with a mold on the conveyer and movable on said carrier toward and from the conveyer, a driven shaft on the carrier extending lengthwise of the conveyer path and controlling the movement of the plunger relatively to the carrier, a stationary bearing for said shaft, a spring engaging said bearing and tending to push said shaft and the carrier away from the bearing, and driving mechanism for said shaft, brought into and out of operation by the movement of said carrier.

9. In a machine of the class described, a conveyor for feeding molds, a carrier movable lengthwise of the conveyer path and adjacent thereto, a molding plunger adapted to co-operate with a mold on the conveyer and movable on said carrier toward and from the conveyer, a driven shaft on the carrier, extending lengthwise of the conveyer path and controlling the movement of the plunger relatively to the carrier, a friction disk held to turn with said shaft but slidable lengthwise thereof, a stop on the shaft, adapted to be engaged by said disk, a spring tending to keep the disk against said stop, and a friction pulley, journaled in a stationary bearing and adapted to come into and out of driving engagement with said disk as the carrier moves in the same direction as the conveyer and in the opposite direction.

10. In a machine of the class described, a mold having core portions arranged in a plurality of parallel rows each composed of a plurality of such core portions, and molding members located adjacent to said core portions and forming pockets on opposite sides thereof, and a plunger adapted to register with said mold and provided with jaws adapted to enter said pockets and to sever the material between adjacent rows and also to mold such material about said core portions.

11. A device according to claim 10, in which the jaws are arranged in rows, and in which a transverse cutter, carried by the plunger, is adapted to sever the material between core portions of the same row.

In testimony whereof I have hereunto set my hand.

JEAN BAPTISTE ICRE.